United States Patent Office 3,784,599
Patented Jan. 8, 1974

3,784,599
WATER-SOLUBLE QUATERNARY AMMONIUM PHTHALOCYANINE DYESTUFFS
Patrick J. Jefferies, Erlanger, Ky., and Nathan N. Crounse, Cincinnati, Ohio, assignors to Sterling Drug Inc., New York, N.Y.
No Drawing. Continuation-in-part of application Ser. No. 51,676, July 1, 1970, now Patent No. 3,709,903, which is a continuation-in-part of application Ser. No. 777,884, Nov. 21, 1968, which in turn is a continuation-in-part of application Ser. No. 551,868, May 23, 1966, both now abandoned. This application Nov. 22, 1971, Ser. No. 201,153
Int. Cl. C09b 47/04; D06p 1/14
U.S. Cl. 260—242
2 Claims

ABSTRACT OF THE DISCLOSURE

Water-soluble cationic dyestuffs of the formula

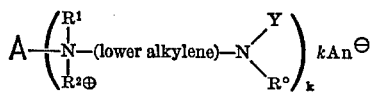

wherein $R°$ is hydrogen, lower-alkyl or hydroxy-lower-alkyl;
$R^1$ is lower-alkyl, lower-alkenyl or hydroxy-lower-alkyl;
$R^2$ is lower-alkyl, lower-alkenyl, hydroxy-lower-alkyl or -(lower-alkylene)-$NR°Y$ or $R^1$ or $R^2$ together with the nitrogen atom, are pyrrolidino, piperidino or 4-lower-alkanoyl piperazino;
Y is hydrogen or

wherein R is hydrogen, lower-alkyl, lower-alkenyl, phenyl or phenyl-lower alkyl;
A is a phthalocyanine dyestuff radical attached to $k$ quaternary ammonium nitrogen atoms through the same number of methylene bridges;
$k$ is a small integer whose value has a range from one to five; and
An is an anion;

are particularly useful for coloring natural fibers, synthetic fiber-forming materials and cellulosic materials. These dyes dye cotton and paper various shades of a stable turquoise. The dyeings from these dyes on paper are less prone to bleed and have a high degree of color discharge when bleached with hypochlorite or chlorine bleaches.

---

This application is a continuation-in-part of our prior copending application Ser. No. 51,676, filed July 1, 1970 (now U.S. Pat. 3,709,903, issued Jan. 9, 1973), which in turn is a continuation-in-part of our now-abandoned application Ser. No. 777,884, filed Nov. 21, 1968, which in turn is a continuation-in-part of our now-abandoned application Ser. No. 551,868, filed May 23, 1966.

This invention relates to cationic dyestuffs. More particularly, the present invention relates to novel water-soluble quaternary ammonium phthalocyanine dyestuffs useful in the dyeing art, particularly for coloring natural fibers, synthetic fiber-forming material and cellulosic materials such as threads, sheets, fibers, filaments, textile fabrics and the like, as well as in the manufacture of paper, varnishes, inks, coatings, and plastics.

In the first of its composition of matter aspects, the invention sought to be patented resides in the concept of the novel water-soluble quaternary ammonium phthalocyanine compounds having the formula

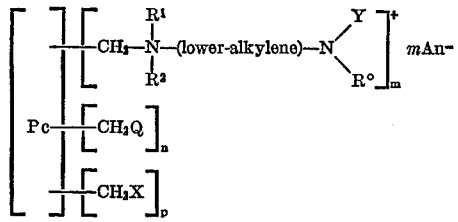

wherein m is an integer from one to five, n is an integer from zero to two, and p is an integer from zero to four, wherein $m+n+p$ does not exceed 5; Pc is a metal-free phthalocyanine radical or a metal phthalocyanine radical wherein the metal is copper, cobalt, iron, nickel or zinc; Q is hydroxy, lower-alkoxy, hydroxy-lower-alkoxy, phenoxy, amino or hydrazino; $R°$ is hydrogen, lower-alkyl or hydroxy-lower-alkyl; $R^1$ is lower-alkyl, lower-alkenyl or hydroxy-lower-alkyl; $R^2$ is lower-alkyl, lower-alkenyl, hydroxy-lower-alkyl or -(lower-alkenylene)-$NR°Y$ or $R^1$ and $R^2$ together with the nitrogen atom are pyrrolidino, piperidino or 4-lower-alkanoyl piperazino; Y is hydrogen or

wherein R is hydrogen, lower-alkyl, lower-alkenyl, phenyl or phenyl-lower-alkyl; An is an anion; and X is halogen, i.e., chlorine, bromine, iodine or fluorine, preferably chlorine or bromine.

A particular embodiment in accordance with this aspect of the invention comprises the water-soluble dyestuffs characterized by the presence in the molecule of from one to five N-(carboxylic-acylamino-lower-alkyl)-quaternary ammonium radicals in which the quaternary ammonium nitrogen atoms are each attached to a phthalocyanine radical through a methylene bridge. This embodiment of the invention is illustrated graphically by Formula II

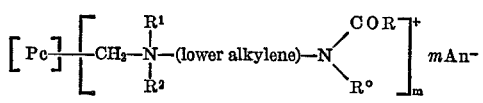

Formula II wherein Pc is a metal-free phthalocyanine radical or a metal phthalocyanine radical wherein the metal is copper, cobalt, iron, nickel or zinc, m is an integer of from one to five, and An, R, $R°$, $R^1$, and $R^2$ each have the same respective meanings indicated in relation to Formula I.

As used throughout, the term "lower-alkyl" is a saturated straight- or branched-chain aliphatic radical of from one to six carbon atoms. Lower-alkyl radicals are represented by, for example, methyl, ethyl, propyl, isopropyl, butyl, tert.-butyl, isobutyl, amyl, isoamyl, hexyl and the like.

As used herein, the term "An" represents anion. By anion is meant any monovalent ion derived from an organic or inorganic acid, H anion, by the removal of an acidic hydrogen ion. Exemplary anions are, halide, hydroxy, alkanoate, nitrate, phosphate, alkylsulfonate and arylsulfonate. Other monovalent anions are found in the literature for example, Hackh's Chemical Dictionary, 3rd ed. (1946), at pp. 12–13, and Chemical Abstracts, vol. 56, Nomenclature, at pp. 72n–80n, both incorporated herein by specific reference thereto. As is known, one anion can be changed to another anion by use of conventional ion exchange methods. The halides, i.e., chloride, bromide, fluoride and iodide and in particular chloride and bromide are particularly preferred as the anion for the dyestuffs of this invention because of the generally ready availability of the quaternizing agents containing them. However, the scope of the compounds herein described and claimed is in no way to be thereto restricted.

As used throughout, the term "lower-alkoxy" means an alkoxy radical in which the aliphatic portion is a saturated straight- or branched-chain of from one to four carbon atoms. Lower-alkoxy radicals are represented by, for example, methoxy, ethoxy, propoxy, butoxy, isopropoxy, tert.-butoxy and the like.

As used throughout, the term "lower-alkenyl" is a straight- or branched-chain aliphatic radical of from two to six carbon atoms containing at least one carbon-to-carbon double bond. Lower-alkenyl radicals are represented by, for example, vinyl, allyl, methallyl, 2-butenyl, 2,4-pentadienyl, 3-hexenyl, and the like.

As used throughout, the term "(lower-alkylene)" means a divalent, saturated straight- or branched-chain aliphatic radical of from two to six carbon atoms having valence bonds attached to different carbon atoms. Thus, radicals represented by the term "(lower-alkylene)" are, for example, $-CH_2-CH_2-$, $-CH_2-CH_2-CH_2-$, $-(CH_2)_4-$, $-(CH_2)_5-$, $-(CH_2)_6-$, $-CH(CH_3)CH_2-$, $-CH_2-CH_2-(CH_3)-CH_2$, $-CH_2-CH_2-CH(C_2H_5)-CH_2-$ and the like.

The benzene ring of phenyl can bear substituents of the kind commonly employed in the phthalocyanine art. The presence of such substituents does not ordinarily affect adversely the properties of the resulting dyestuffs, and such substituted compositions are the full equivalents of the compositions claimed herein.

As used throughout, the term "carboxylic-acyl" is a radical derived by the removal of the hydroxy radical from a carboxylic acid. The carboxylic-acyl groups,

(shown alternatively herein as —COR) are represented by lower-alkanoyl, wherein R is lower-alkyl; lower-alkenoyl, wherein R is lower-alkenyl; benzoyl, wherein R is phenyl, which may be substituted on the benzene ring thereof without deleterious effects; and phenyl-lower alkanoyl, wherein R is phenyl-lower-alkyl. Examples of carboxylic-acyl groups include, for example, formyl, acetyl, propionyl, isobutyryl, acrylyl, methacrylyl, benzoyl, p-toluoyl, p-nitrobenzoyl, o-chlorobenzoyl, phthaloyl, phenylacetyl, p-methoxyphenylacetyl, and the like.

The term "Pc," defined as a phthalocyanine radical, represents a phthalocyanine from which $m$ hydrogen atoms have been removed. The term "phthalocyanine" is used herein in the generic sense to mean the class of tetra-azaporphins in which each of four pyrrole nuclei is fused to an aromatic nucleus, e.g. that of benzene. Phthalocyanine itself (tetrabenzotetraazaporphin) is a well-known example of the class, but the usefulness of this invention is not limited thereto. Moreover, the phthalocyanine radical, Pc, can be metal-free, or it can contain a metal in complex combination, for example, copper, cobalt, nickel, iron, zinc and the like. In addition the phthalocyanine radical can be substituted with substituents known in the art to modify the shade and other physical characteristics of the phthalocyanines in general. Examples of such substituents include chloro, bromo, sulfonic acid, phenyl, benzoyl and methyl.

The "halogenomethyl" group in the starting material is represented by $-CH_2F$, $-CH_2Cl$, $-CH_2Br$ and $-CH_2I$. Because they are much cheaper to prepare, we prefer to use as the starting material chloromethyl-substituted phthalocyanines which are conveniently prepared by methods known to the art.

As used throughout, the term "halogen" includes bromine, chlorine, iodine and fluorine.

A preferred embodiment in accordance with the phthalocyanine composition aspect of this invention comprises the highly water-soluble phthalocyanine dyestuffs characterized by the presence in the molecule of from one to five N-(amino-lower-alkyl) quaternary ammonium radicals in which the quaternary ammonium nitrogen atoms are each attached to a phthalocyanine radical through a methylene bridge. These dyestuffs are preferred because of their high substantivity to various fibers and in particular to cellulosic materials. This embodiment of the invention is illustrated graphically by Formula III

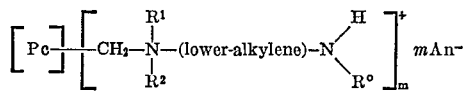

Formula III wherein Pc, R°, R¹, R², $m$, An and (lower-alkylene) are as defined above in relation to Formula II.

Another particular embodiment in accordance with the phthalocyanine composition aspect of this invention comprises the water-soluble pthalocyanine dyestuffs characterized by the presence in the molecule of from one to five 4-(carboxylic-acyl)piperazinimum radicals. The dyestuffs according to this embodiment of the invention are illustrated graphically by Formula IV

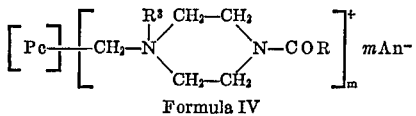

Formula IV wherein Pc, R, $m$, and An are each as defined above and R³ is a member of the class consisting of lower-alkyl, hydroxy-lower-alkyl, and phenyl-lower-alkyl.

Still another particular embodiment in accordance with the phthalocyanine composition aspect of this invention comprises valuable and highly water-soluble dyestuffs obtained by removing the carboxylic-acyl group, —COR, from dyestuffs of Formula IV. The phthalocyanine dyestuffs produced according to this embodiment of the invention are characterized by the presence in the molecule of from one to five piperazinium raricals, and are illustrated graphically by Formula V

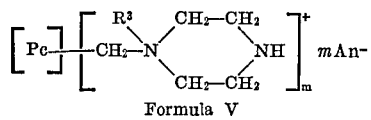

Formula V wherein Pc, R³, $m$ and An as defined above. The dyestuffs of this embodiment of the invention are conveniently prepared by hydrolysis of the 4-(carboxylic-acyl)piperazinium dyestuffs illustrated by Formula V by heating said compounds in dilute aqueous alkali, or preferably in dilute aqueous mineral acid, for example dilute hydrochloric acid, as described hereinbelow.

In the first of its process aspects, the invention sought to be patented resides in the concept of the process which comprises heating a halogenomethyl-substituted phthalocyanine, i.e., a phthalocyanine bearing from one to five halogenomethyl substituents, with a compound of the formula

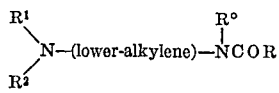

wherein R, R°, R¹ and R² have the same respective meanings given hereinbefore, in a suitable medium, for example a polar solvent. Quaternization is usually complete in from two to forty-eight hours, depending upon the nature of the reactants, the nature of raction medium, and the reaction temperature. The reaction generally proceeds readily at temperatures in the range 50–110° C. It is convenient to employ a reaction medium which boils within the specified range in order that the reaction temperature is maintained by merely refluxing the medium. Convenient media for carrying out the process according to this aspect of the invention include water; the lower alcohols, for example, methanol, ethanol, isopropyl alcohol, and the like; the lower-alkylene glycols, for example, ethylene glycol and propylene glycol; acetonitrile; and dimethylformamide. We generally prefer to use water or isopropyl alcohol as the reaction media because they have suitable boiling points and are inexpensive.

The starting materials for preparing the compounds of Formula II are known classes of compounds, the methods of preparation of which are described in the prior art. For example, the poly(halogenomethyl)phthalocyanines are prepared by causing phthalocyanines to react with formaldehyde and a hydrogen halide or alternatively from phthalocyanines and bis(halomethyl) ether. The carboxylic-acylamino-lower-alkylamines are prepared by acylating alkylenediamines in which one of the nitrogen atoms is disubstituted and the other is either unsubstituted or monosubstituted. The reaction is carried out according to conventional procedures by causing the amine function (bearing at least one hydrogen atom) of an alkylenediamine, $R^1R^2N$-lower-alkylene-$NHR°$, to react with an acylating agent, for example, a carboxylic acid, carboxylic acid anhydride, carboxylic acid ester, or a carboxylic acid halide. Examples of such acylating agents include formic acid, acetic anhydride, phthalic anhydride, methyl benzoate, benzoyl chloride, and the like.

The dyestuffs of the embodiment of the invention illustrated by Formula III are prepared by removing the carboxylic acyl groups, —COR, from the dyestuffs of Formula II which contain from one to five carboxylic-acylamino-lower-alkyl-quaternary ammonium halide radicals each bonded to the phthalocyanine group through a methylene bridge, as described above. The removal of the carboxylic acyl groups is conveniently accomplished through hydrolysis by heating the acylamino dyestuffs in admixture with dilute aqueous acid. We generally prefer to prepare the quaternary ammonium dyestuffs in the form of the chloride salt because the chlorides are inexpensive; therefore, we prefer to hydrolyze the acylamine groups with dilute hydrochloric acid in order to prevent introduction of extraneous anion contaminants. However, the hydrolysis is effectively accomplished by any of the common dilute mineral acids, for example, hydrochloric acid, hydrobromic acid, hydriodic acid, sulfuric acid, phosphoric acid, and the like, as well as by aqueous strong organic acids, for example p-toluene-sulfonic acid, benzenesulfonic acid, and the like. Moreover, inasmuch as carboxylic-acylamides are known to be hydrolyzed by aqueous alkali, such may also be used for the hydrolysis herein, but with concomitant introduction of the hydroxide ion as an anion contaminant.

The dyestuffs prepared according to the embodiments of the invention illustrated by Formula III and Formula V, each contain a basic amino group in addition to the quaternary ammonium group which characterizes all of the dyestuffs of our invention. It is obvious that the said phthalocyanine amino-basic dyestuffs can exist either in free base form or in acid-addition salt form. For the purpose of our invention, the two forms are fully equivalents, because the dyestuffs are water-soluble in either form, and salt formation is believed not to affect the physical properties of the dyestuffs either adversely or beneficially.

The dyestuffs of the embodiment of the invention illustrated by Formula IV are prepared by reacting a poly(halogenomethyl)phthalocyanine with a 4-carboxylic-acylated piperazine of the formula

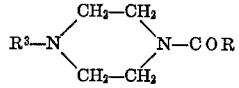

wherein R and $R^3$ are defined above. The reaction conditions for the preparation of dyestuffs according to this aspect of our invention are in all respects the same as those for the preparation of compounds of Formula II.

The acylated piperazine starting material is prepared by the conventional acylation of the appropriate monosubstituted piperazine, for example, N-methylpiperazine, N-ethylpiperazine, N - (2 - hydroxyethyl)piperazine, N-benzylpiperazine, N-(chlorobenzyl)piperazine, and the like. In the preparation of the acylated amine reactants herein which also contain a hydroxyl group, the amine may be preferentially acylated by known methods, or the hydroxyl group as well as the amine group may be acylated, and, if desired, the acyl group may be removed by hydrolysis after the formation of the water-soluble phthalocyanine dyestuffs described herein.

Although the dyestuffs obtained in accordance with the phthalocyanine composition and process aspects of the invention include especially those compositions depicted generically by Formulas II, III, IV and V, it is possible, and indeed probable, that the preparative reactions lead to the formation of products which, in addition to the quaternary-ammonium functional groups, contain functional groups, Q, resulting from the reaction of halogenomethyl groups with the solvent, particularly when the solvent is water or an alcohol. For example, when isopropyl alcohol is employed as the reaction medium in the quaternization, the formation of quaternary ammonium phthalocyanine compounds of this invention containing one or more isopropoxymethyl moieties is likely. Similarly, when water is employed as the reaction medium, it is likely that products having one or more hydroxymethyl moieties will be formed. We also envisage the intentional incorporation of said substituent, for example, hydroxy, amino, hydrazino, hydroxy-lower-alkoxy, and phenoxoy moieties in the quaternary ammonium phthalocyanine dyestuffs in order to vary slightly the physical properties, for example, the shade and solubility, thereof. Such incorporation is easily accomplished by adding quantities of water, amines, hydrazines, lower alcohols, or phenols as reactants to the mixture before quaternization is complete. The phthalocyanine compounds containing such groups in addition to the quaternary-ammonium functional groups which characterize our dyestuffs are within the scope of our invention.

The new water-soluble quaternary ammonium-substituted phthalocyanine dyestuffs disclosed herein are useful dyestuffs which can be applied to natural fibers, to fiber-forming synthetic materials and to cellulosic materials by methods conventional in the dyeing art since it has been found that the dyestuffs of this invention are substantive to wool, silk, nylon, rayon, polyacrylonitrile, cotton and paper. The dyed products thus obtained are stable to ultra-violet light and to washing. The novel dyes are especially valuable for imparting various shades of a stable turquoise, color to cotton and to paper, both sized and unsized. For use in the paper trade, our dyes have several outstanding advantages over quaternary ammonium dyes in the prior art. First, our dyes are less prone to "bleed" when paper impregnated with the dyes is wet and placed in contact with moist white paper. This is a particularly desirable property for dyes designed for coloring paper to be used in facial tissues, napkins and the like, wherein it can be foreseen that the colored paper, while wet, may come in contact with other surfaces, such as textiles, paper and the like, which should be protected from stain. Another advantageous property of our new dyes for use in the paper trade is found in their high degree of color discharge when bleached with hypochlorite or "chlorine" bleach. This property of dyes is particularly desired by papermakers in order that dyed paper may be completely bleached prior to reprocessing. Still another advantageous property of our dyestuffs is found in their high resistance to a change of shade when used to color cellulosic materials, which have either previously been treated with or are treated subsequent to dyeing, with wet-strength resin.

The carboxylic-acylamino compounds and the free amino compounds of the instant invention are substantially equal with respect to their bleachability. With respect to shade, in general, the free amino compounds have slightly deeper shades than the carboxylic acylamino compounds. Presumably because of the availability of the free amine group to bond with the fiber and wet-strength resin or similar paper additives, the free amino compounds are, in general, less prone to bleed than are the carboxylic acyl amino compounds both when wet with water alone and in the presence of soap.

Yet another advantage of the dyes of this invention is their property of being absorbed by cellulosic fibers from aqueous solution to a very high degree and at a very rapid rate. This property is advantageous to the paper industry, because it allows the dye to be added to the pulp just prior to formation of the sheet.

The structures of the novel compounds herein disclosed were established by their mode of synthesis and analysis of their infra-red absorption spectra, and were corroborated by the correspondence of calculated and found values of elemental analyses of representative samples.

Our invention is further illustrated by the following procedures and examples, which are given for the purpose of illustration only, and not to limit the invention thereto. All parts are parts by weight.

PREPARATION OF INTERMEDIATES (A) Tetrakis(chloromethyl)copper phthalocyanine

Copper phthalocyanine was chloromethylated according to known procedures by interacting 250 parts of acid pasted copper phthalocyanine with 435 parts of paraformaldehyde and 418 parts of phosphorus oxychloride in 825 parts of 98 percent sulfuric acid and 1630 parts of chlorosulfonic acid. Elemental analyses of the resulting bright blue powder were in excellent agreement with the calculated analysis of tetrakis(chloromethyl)copper phthalocyanine.

(B) Carboxylic-acylamino lower-alkylamines

The following N - $R^1$ - N - $R^2$ - N - [(lower - alkylene)-NR°COR]amines were prepared by interaction of the indicated unsymmetrically disubstituted alkylene diamine and acylating agent using procedures well known in the art for acylation.

(1) N-(3-dimethylaminopropyl)formamide from 327 parts of N,N-dimethyl-1,3-propanediamine and 180 parts of 90 percent formic acid;

(2) N,N-bis(3 - formamidopropyl)methylamine from 218 parts of N,N-bis(3-aminopropyl)methylamine and 203 parts of 90 percent formic acid;

(3) N-(3 - diethylaminopropyl)formamide from N,N-diethyl-1,3-propanediamine and 90 percent formic acid;

(4) N-(3 - dimethylaminopropyl)benzamide from 107 parts of N,N-dimethyl-1,3-propanediamine and 141 parts of benzoyl chloride;

(g) N-(3 - dimethylaminopropyl)acetamide from N,N-dimethyl-1,3-propanediamine and acetyl chloride;

(6) N-(4-diethylamino-1-methylbutyl)formamide from N,N-diethyl-4-methyl-1,4-diaminobutane and 90 percent formic acid;

(7) N-(3-dimethylaminopropyl)phthalamic acid from 102 parts of N,N-dimethyl-1,3-propane diamine and 141 parts of phthalic anhydride;

(8) N-(3-diethanolaminopropyl)formamide from N-(3-aminopropyl)diethanolamine and 90 percent formic acid;

(9) N-[2-(4-formylpiperazino)ethyl]formamide from 2-(4-formylpiperazine)ethylamine and 90 percent formic acid; and

(10) N-(2-dimethylaminoethyl)formamide from 2-dimethylaminoethylamine and 90 percent formic acid.

The following carboxylic-acylamino lower-alkylamines which are within the purview of this invention, are prepared using art-known procedures by acylation of the indicated unsymmetrically substituted diamine with the indicated acylating reagent:

N - [2 - (N - ethyl-N-1-methylbutyl)aminoethyl]propionamide from 2-(N-ethyl-N-1-methylbutylamino)ethylamine and propionic anhydride;

N-(6-dimethylaminohexyl)iso-butyramide from 6-(dimethylamino)hexylamine and iso-butyryl chloride;

N-[2-(N-allyl - N - ethyl)aminoethyl]p - chlorobenzamide from 2-(N-allyl-N-ethylamino)ethylamine and p-chlorobenzoyl chloride;

N-[2-(N-ethyl - N - methyl)aminoethyl]propionamide from 2-(N-methyl-N-ethylamino)ethylamine and propionyl chloride;

N - (2 - piperadinoethyl)acrylamide from 2-piperidinoethylamine and ethyl acrylate;

N - [2 - (N - n - butyl-N-isopropyl)aminoethyl]phenylacetamide from 2-(N-butyl-N-isopropylamino)ethylamine and ethyl phenylacetate;

N - (3 - pyrrolidinylpropyl)valeramide from 3-pyrrolidinopropylamine and valeryl chloride;

N - (2 - diallylaminoethyl)phenylpropionamide from 2-(diallylamino)ethylamine and ethyl phenylpropionate;

N-(2-diethylaminopentyl) - 2 - methylacrylamide from 5-(diethylamino)pentylamine and methyl methacrylate;

N-(2-diisopropylaminoethyl)p-methoxybenzamide from 2-(diisopropylamino)ethylamine and p-methoxybenzoyl chloride;

N - (2 - diisopentylaminoethyl)butyramide from 2-(diisopentylamino)ethylamine and butyryl chloride;

N - (2 - dihexylaminoethyl)n-caproamide from 2-dihexylaminoethylamine and caproyl chloride;

1-benzyl-4-formyl piperazine from 1-benzylpiperazine and formic acid;

N-(6-diisobutylaminohexyl)acetamide from 6 - diisobutylamino)hexylamine and acetic anhydride;

N-(1-methyl-3-diethylaminopropyl)acrylamide from 3-amino-N,N-diethylaminobutylamine and ethyl acrylate;

1-ethyl-4-propionyl piperazine from 1-ethylpiperazine and propionyl chloride;

N-(2-di-n-propylamino - 2 - methylethyl)-p-nitrobenzamide from 2-methyl-2-di-n-propylaminoethylamine and ethyl p-nitrobenzoate;

N-(2-hydroxyethyl) - N - (3 - dimethylaminopropyl) formamide from N'-(2-hydroxyethyl)-N,N-dimethyl-1,2-ethylenediamine and 90 percent formic acid;

N - [3 - (N - methyl-N-2-acetamidoethyl)aminopropyl] acetamide from N-methyl-N-2-aminoethyl-1,3-propanediamine and acetyl chloride;

N-methyl-N-[2-(N-ethyl - N - methyl)aminoethyl]propionamide from N - methyl-2-(N-methyl-N-ethylamino) ethylamine and propionyl chloride;

N - (3 - hydroxypropyl)-N-(3-dimethylaminopropyl) formamide from N'-(3-hydroxypropyl)-N,N-dimethyl-1,3-propanediamine and 90 percent formic acid;

N,N - bis[3-(N-methylformamido)propyl]methylamine from N,N - bis[3-(N-methylamino)propyl]methylamine and 90 percent formic acid;

N - isopropyl-N-(2-piperidinoethyl)acrylamide from N-isopropyl-2-piperidinoethylamine and ethyl acrylate;

N-n-hexyl-N-[2-N-ethyl - N - methyl)aminoethyl]propionamide from N-n-hexyl-2-(N-methyl-N-ethylamino) ethylamine and propionic anhydride;

N - ethyl-N-(2-di-n-propylamino-2-methylethyl)p - nitrobenzamide from N-ethyl-2-methyl-2-di-n-propylaminoethylamine and ethyl p-nitrobenzoate;

N-(2-hydroxyethyl)-N-(4-diethylamino - 1 - methylbutyl)-formamide from N'-(2-hydroxyethyl) - N,N - diethyl-4-methyl-1,4-diaminobutane and 90 percent formic acid;

N-n-butyl - N - [2 - (4 - formylpiperazino)ethyl]acetamide from N-n-butyl-2-(4-formylpiperazino)ethylamine and acetic anhydride;

N - [3 - (N - methylacetamido)propyl]-N-(2-(N-methylacetamido)ethyl]methylamine from N-[3-(N-methylamino)propyl] - N - [2 - (N - methylamino)ethyl]methylamine and acetyl chloride;

N - methyl - N-(3-pyrrolidinylpropyl)valeramide from

N-methyl-3-pyrrolidinylpropylamine and valeryl chloride;

N - (2 - diethanolamino - 1,1 - dimethylethyl)phenylacetamide from 2-diethanolamino-1,1-dimethylethylamine and ethyl phenylacetate;

1-(2-hydroxyethyl)-4-(m-toluoyl)piperazine from N-(2-hydroxyethyl)piperazine and methyl m-toluate;

N-[3-(N-isopropyl - N - methyl)aminopropyl]salicylamide from 3-(N-isopropyl-N-methylamino)propylamine and methyl salicylate; and 1-methallyl - 4 - valerylpiperazine from 1-methallylpiperazine and valeryl chloride.

PREPARATION OF THE PHTHALOCYANINE DYESTUFFS AND TESTING PROCEDURES

Example 1

To a solution containing 180 parts of N-(3-dimethylaminopropyl)formamide in 785 parts of isopropyl alcohol were added 179.4 parts of tetrakis(chloromethyl)copper phthalocyanine. The mixture was heated under reflux with constant stirring for 3 hours, after which time the mixture was allowed to cool and the lumpy solid was removed by filtration. The filter cake was washed well with isopropyl alcohol. The resulting highly water-soluble, brilliant turquoise powder was purified by dissolving it in water, precipitating the dye with acetone, and collecting the product by filtration. The filter cake was washed well with isopropyl alcohol and was dried at 75–80° C. Chemical analysis of the product showed that an average of approximately two of the chloromethyl groups reacted to form quaternary ammonium groups and an average of approximately two of the chloromethyl groups reacted with the isopropyl alcohol solvent to form isopropoxy groups.

Chromaticity data were determined by test procedures outlined below on handsheets dyed with the dyestuff prepared as above by incorporating the dyestuff with aqueous slurries of paper-pulp in an amount equal to about 0.1 percent by weight based upon the weight of dry pulp. These data showed that the dominant wavelength (shade) of the dyed handsheet was 486.4 millimicrons and the excitation purity was 24.2. The tristimulus Y value (brightness to the eye) was 63.1.

An aqueous solution containing 0.03 g. of this dyestuff per liter of solution had two maxima in the visible absorption spectrum: at 618 millimicrons, A=1.27 and at 665 millimicrons, A=0.88.

In the bleach test described below, papers dyed with this dyestuff were found to be highly bleachable. The dye was found to bleed slightly in the water-bleed test and in the soap-bleed test.

When the above preparation was repeated using dimethylformamide as the reaction medium, the product again precipitated from the reaction mixture as quaternization proceeded. The resulting product contained an average of between two and three quaternary ammonium groups of the formula

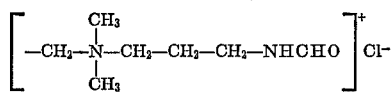

When the reaction was conducted in ethylene glycol, the dyestuff above, containing in addition a minor quantity of hydroxyethoxymethylene substitution, was obtained.

When the reaction was conducted in water, the quaternized final product remained in solution and more complete quaternization of the chloromethyl was attained. However, it is likely that a certain amount of hydrolysis of chloromethyl substituents to hydroxymethyl substituents occurred to yield predominately the dyestuff of the formula

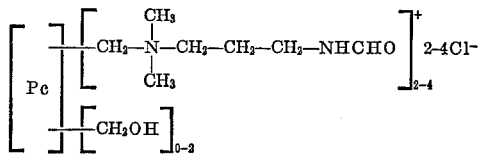

The dyestuff prepared in water was somewhat greener in shade than the dyestuff prepared in either isopropyl alcohol or dimethylformamide.

When this reaction is repeated and into the reaction medium is introduced a quantity of phenol, an amine, for example triethylamine, morpholine, ethanolamine, and dibutylamine, or a hydrazine, for example, hydrazine hydrate, unsymmetrical dimethylhydrazine, and isopropylhydrazine in an amount equivalent to one to two molecular equivalents for each molecular equivalent of phthalocyanine reactant, a dyestuff containing an average of from one to two phenoxy, amino, or hydrazino substituents, respectively, is obtained.

Testing procedures

The following test procedures were ememployed to determine the relative shades of the dyestuffs produced and to determine the resistance of the dyestuffs to bleed in moist paper, bleed from paper in the presence of soap, and to bleaching with hypochlorite bleach.

Shade

Chromaticity values of dominant wavelength and excitation purity are determined by measuring the reflectance tristimulus values of dyed handsheet paper on a General Electric recording spectrophotometer in combination with a Librascope automatic tristimulus integrator and plotting the points on a chromaticity diagram according to the procedure described by A. C. Hardy, "Handbook of Colorimetry," The Technology Press, Massachusetts Institute of Technology, Cambridge, Mass., 1936.

The dominant wavelength is a measure of the shade imparted to the paper by the dye, and the excitation purity is a measure of the saturation or depth of the color. Inasmuch as the eye is more sensitive to minor variations in color than the most sensitive instrument, the shades imparted to test papers were also compared visually.

In some cases absorbance of aqueous solutions in the visible light region were measured by standard methods on a Perkin-Elmer Model 4000A Spectracord.

Water "bleed" test

This procedure is a modification of the AATCC Standard Test Method 15–1962, "Colorfastness to Perspiration."

Test piece 1⅛ inches in diameter (approximately one square inch area) are cut from the dyed paper to be tested and marked, with lead pencil, to indicate sample and wire (or felt) side. One or more dyed papers of known dye migration quality are included in the test series as standards.

The absorbent material consists of filter paper having at least one side with smooth finish (Eaton-Dikeman No. 613, or equivalent) cut to 2 inch by 3 inch rectangles. In addition, smooth, flat, glass or clear plastic plates of adequate stiffness, measuring 2½ inches wide and 3 to 4½ inches long, are required as separating plates. A 500 gram weight serves as a dead weight loading.

Two filter paper absorbent pieces are used for each dyed paper test circle, one for each side. These are marked on the smoother surface (with lead pencil) prior to beginning the test to indicate the sample and the sample surface (wire or felt) which it will contact.

The migration test "sandwich" is constructed as follows. A separating plate is placed on a horizontal support and one piece of the filter paper placed centrally on this plate with the smoother side up. The circular dyed paper test piece, held by tweezers, is immersed in water at room temperature for 3 seconds, drained for 3 seconds, and immediately centered on the filter paper, making sure that side (wire or felt) identifications are correct. Immediately, the second piece of filter paper, smoother side downward, is centered on the test circle and followed at once by another separating plate. This "sandwich" is pressed for a moment with the fingers, after which, without delay, a piece of filter paper is positioned on the top separating plate as before to receive a second test circle of wetted dyed paper. The above procedure is then repeated as rapidly as possible and without interruption, stacking one "sandwich" on the other, until all dyed paper test pieces have been put under test.

As soon as a stack is completed a 500 gram weight is centered on the top separating plate, and the assembly shrouded with moisture vapor resistant film to avoid undue drying. The stack is allowed to stand at room temperature for 4 hours, during which time ambient temperatures are occasionally recorded.

At the end of the migration period the stack is disassembled, and each dyed peper test circle and its two filter paper absorbents clipped to a supporting card. A separate card is used for each test circle. The dyed paper test circles and filter papers are air dried at room temperature for at least two hours before ranking. Relative degrees of the dye migration, as compared to that from standard samples, are determined by visual ratings, under Macbeth Northlight, of the intensity of dye stain on the filter paper surface which had been in contact with the test circle. Migration from the wire and felt sides are ranked separately.

Soap bleed test

This test compares the degree to which dyed papers will discolor a soap solution in which the paper is immersed.

A stock supply of soap solution containing 0.5% soap by weight is prepared by adding neutral white soap flakes (a mixture of 80 percent sodium soap and 20 percent potassium soap produced from 70 percent tallow and 30 percent coconut oil glyceride blend; "Ivory" brand, Procter and Gamble Co. (slowly with stirring to hot tap water and then heated further with occasional stirring to 70–75° C.

Portions of 400 ml. of this solution are measured into 1,000 ml. beakers (one beaker for each test), covered with a watch glass, and allowed to cool to 60–65° C. At this point approximately 1.5 grams of the dyed paper (one-half of a 3.0 gram, 8 inch square handsheet) is crumpled and immersed in its soap test solution.

Soaking is allowed to continue for 20 to 24 hours, with gradual cooling to room temperature. During this period the paper is squeezed by hand while submerged (or stirred vigorously with a glass rod) on at least three occasions during the first five hours, and again about one hour before ending the test period.

At the end of the immersion peroid the beaker contents are stirred and enough immediately screened through a double screen of 100 mesh stainless steel screening to nearly fill a two ounce, square clear glass bottle, which is then capped. These filtrates are then visually rated for color intensity under laboratory ceiling fluoroscent tube lights.

Bleach test

This procedure compares the degree to which the color of dyed or shaded papers would be discharged in a waste paper recovery operation employing hypochlorite bleach.

Test pieces measuring ¾ inch by 1½ inches are die cut from the papers to be compared and identified, using lead pencil markings.

A stock supply of hypochlorite bleach is prepared by diluting commercial hypochlorite bleach (nominal available chlorine content, 5.0%) with distilled water to a concentration of 0.09 gram available chlorine per 100 ml. solution. Before diluting this solution to final volume the pH is adjusted with dilute sulfuric acid to pH 4.0 to 4.5.

Portions of 20 ml. each of the hypochlorite stock solution, at room temperature, are measured into test tubes 1 inch in diameter and 7 to 8 inches long, one tube for each test specimen. An extra such tube is prepared, fitted with a thermometer extending into the bleach solution, to follow the rise in bleach temperature.

One paper test piece is then dropped into each tube and submerged in the bleach liquor, adding all pieces as quickly as possible. The tubes are immediately stoppered and all simultaneously placed in a water bath previously heated to 54 to 56° C. (129 to 133° F.).

The test pieces are observed, especially during the very early minutes of bleaching, for obvious differences in the rate of color discharge. The temperature of the bleach liquors rises rapidly during the first 5 minutes.

While maintaining the water bath temperature in the 54 to 56° C. range, the bleach tubes remain, without agitation of the test pieces, in the water bath for 30 minutes. Occasional readings of the temperature of the "blank" bleach tube during this period are recorded.

At the end of this time all tubes are removed from the water bath, immediately filled with cold tap water, and the test pieces rinsed as quickly as possible, with cold tap water, into a large Büchner funnel (with no filter paper disk) where they are thoroughly washed with running cold tap water. The washed test pieces are finally placed on a blotter and air dried at room temperature.

The relative degree of bleaching is judged by visually-ranking, under Macbeth Northlight, the intensity of residual color in the dry test pieces.

Example 2

An aqueous solution of copper phthalocyanine bis(isopropoxymethyl) bis(methylene 3-formamidopropyl dimethylammonium chloride) prepared in isopropyl alcohol as described in Example 1 from 89.4 parts of tetrakis (colormethyl)copper phthalocyanine and 21.2 parts of N-(3-dimethylaminopropyl)formamide was heated in 75 parts of water containing 12 parts of concentrated hydrochloric acid for about two hours. The reaction mixture was then neutralized with 50 percent aqueous sodium hydroxide. A portion of this solution was filtered through diatomaceous earth, and isopropyl alcohol was slowly added to the filtrate until precipitation just started. When precipitation of the product was complete, the solid was collected on a filter, washed with isopropyl alcohol, and dried at 85° C. Elemental analysis of this product showed that it consisted of a mixture of copper phthalocyanines substituted by an average of approximately two

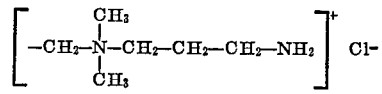

moieties and approximately two isopropoxymethyl moieties.

Chromaticity data based on the spectral reflectance of paper handsheets prepared as described above showed a dominant wavelength of 486.6 millimicrons (slightly greener than the formamide derivative of Example 1) and an excitation purity of 24.4. The tristimulus Y value of brightness was 62.6.

In the bleach test, this dye was found to have excellent bleachability properties not significantly different from the formyl-substituted dyestuff described in Example 1. However, compared to said formyl-substituted dyestuff, this dyestuff showed significantly superior resistance to bleed in both the water bleed and the soap bleed tests.

Example 3

Seven parts of tetrakis(chloromethyl)copper phthalocyanine and 12 parts of N-(3-dimethylaminopropyl)formamide were refluxed in 32 parts of dry methanol for three hours. The reaction mixture was then cooled and filtered through diatomaceous earth. The filtrate was poured into 400 ml. of isopropyl alcohol and the precipitate was collected on a filter, washed well with isopropyl alcohol, and dried. Elemental analysis showed that this product was essentially the tetrakis(quaternary ammonium) compound of the formula

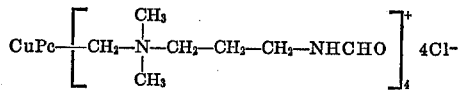

The dyestuffs was highly water-soluble and imparted a brilliant turquoise color to paper.

The visible absorption spectrum of an aqueous solution of this dyestuff containing 0.03 g. of dye per liter of solution had two maxima: at 626 millimicrons, A=1.14; at 672 millimicrons, A=1.375.

Hydrolysis of the above product according to the procedure described in Example 2 yields the compound copper phthalocyanine tetrakis(methylene dimethyl 3-aminopropylammonium chloride) of the formula

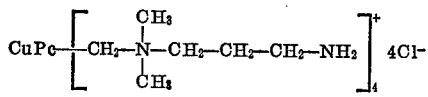

When this reaction is carried out using tetrakis(chloromethyl)phthalocyanine (unmetallized) the corresponding unmetallized water-soluble tetrakis(quaternary ammonium)phthalocyanine dyestuff is obtained.

Example 4

Following the procedure given in Example 1, tetrakis(chloromethyl)copper phthalocyanine was caused to react with six molecular equivalents of 1-methyl-4-formylpiperazine in acetonitrile by heating the mixture at reflux for 27 hours. The mixture was allowed to cool, and the precipitated product was collected on a filter and washed thoroughly with isopropyl alcohol.

The product, which was highly water-soluble, consisted of a mixture of copper phthalocyanine substituted with from two to four (methylene 4-formyl-1-methylpiperazinium chloride) radicals, and having the formula

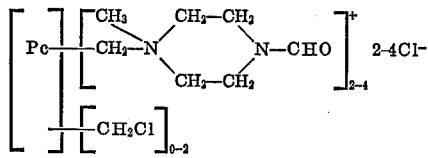

The visible absorption spectrum of an aqueous solution of this dyestuff, containing 0.03 g. of dye per liter of solution, showed two maxima: at 614 millimicrons, A=1.16; at 670 millimicrons, A=0.68.

Hydrolysis of the above-mentioned formamide compound according to the method described in Example 2 yielded a mixture of copper phthalocyanines substituted with from two to four (methylene 4-methylpiperazinium chloride) radicals, and having the formula

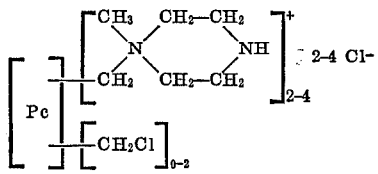

The visible absorption spectrum of an aqueous solution of this dyestuff, containing 1.5 g. of dye per liter of solution, showed two maxima: at 613 millimicrons, A=1.35; at 670 millimicrons, A=0.69.

EXAMPLE 5

Following the procedure given in Example 1, tetrakis(chloromethyl)copper phthalocyanine was refluxed in isopropyl alcohol with six molecular equivalents of N-(3-dimethylaminopropyl)acetamide for three hours. When cool, the reaction mixture was poured into acetone to precipitate the partially-soluble product, which was then collected on a filter and washed well with acetone. The resulting product, consisting primarily of a dyestuff of the formula

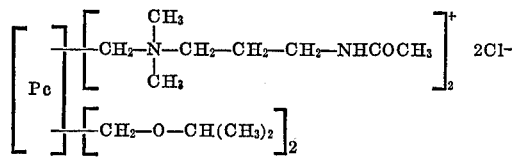

was a brilliant blue powder which was readily soluble in water, leaving no residue.

The visible absorption spectrum of an aqueous solution of this dyestuff containing 0.04 g. of dye per liter of solution showed two maxima: at 620 millimicrons, A=1.4; and at 668 millimicrons, A=1.22.

Chromaticity values of paper handsheets prepared as described in Example 1 showed that the dominant wavelength was 986.6 millimicrons and the excitation purity was 24.0. The tristimulus Y value of brightness was 63.7.

No significant difference was found on the bleachability of paper dyed with this dyestuff in comparison with the dyestuffs described in Examples 1 and 2. In the soap bleed test, this dyestuff showed somewhat less resistance to bleed than did the dyestuff of Example 1.

Example 6

Following the procedure given in Example 1, tetrakis(chloromethyl)copper phthalocyanine was caused to react with six molecular equivalents of N-(4-diethylamino-1-methylbutyl)formamide in acetonitrile by heating the mixture at reflux for 24 hours. The mixture was allowed to cool, and the precipitated product was collected on a filter and washed with acetone.

The water-soluble product consisted of a mixture of copper phthalocyanines substituted with from two to four

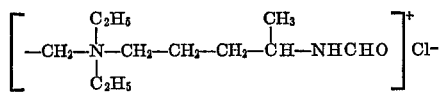

moieties and with 0 to 2 chloromethyl moieties.

The visible absorption spectrum of an aqueous solution of this dyestuff, containing 0.03 g. of dye per liter of solution showed two maxima: at 619 millimicrons, A=1.04; at 670 millimicrons, A=0.705.

Hydrolysis of the above-mentioned formamide compound according to the method described in Example 2 yielded a mixture of copper phthalocyanines having the formula

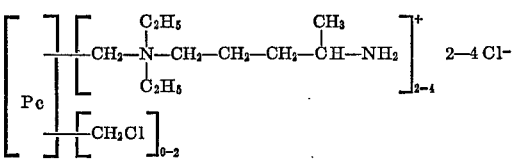

The visible absorption spectrum of an aqueous solution of this dyestuff containing 0.75 g. of dye per liter of solution showed two maxima: at 624 millimicrons, A=1.262; at 671 millimicrons, A=1.08.

Example 7

Following the procedure given in Example 1, a mixture of tetrakis(chloromethyl)copper phthalocyanine and six molecular equivalents of N-(3-diethylaminopropyl) formamide in acetonitrile was heated at reflux for 14 hours. The mixture was allowed to cool, and the precipitated product was collected on a filter. After drying there was obtained a mixture of copper phthalocyanines substituted with from two to four

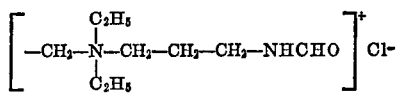

moieties and from 0 to 2 chloromethyl moieties.

The visible absorption spectrum of an aqueous solution of this dyestuff, containing 0.03 g. of dye per liter of solution showed two maxima: at 615 millimicrons, A=1.09; at 670 millimicrons, A=0.64.

Hydrolysis of the above-mentioned formamide compound according to the method described in Example 2 yielded a mixture of copper phthalocyanines having the formula

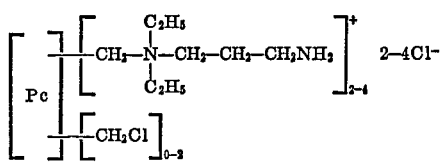

The visible absorption spectrum of an aqueous solution of this dyestuff containing 0.75 g. of dye per liter of solution, showed two maxima: at 618 millimicrons, A=1.16; at 670 millimicrons, A=0.72.

Example 8

Proceeding in a manner similar to that described above in Example 1, a mixture of tetrakis(chloromethyl)copper phthalocyanine and six molecular equivalents of N,N-bis(3-formamidopropyl)methylamino in acetonitrile was heated at reflux for four hours. The mixture was allowed to cool and the coagulated product was collected on a filter, and washed with isopropyl alcohol. The product was dried at 90° C. in vacuo to obtain a product consisting primarily of a dyestuff of the formula

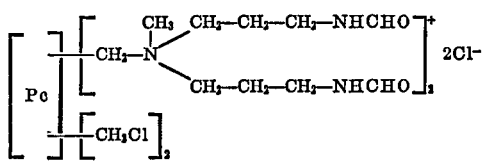

which was a water-soluble blue powder.

The visible absorption spectrum of an aqueous solution of this dyestuff containing 0.04 g. of dye per liter of solution showed two maxima: at 612 millimicrons, A=1.292; and at 668 millimicrons, A=1.22.

Hydrolysis of this formamide compound following a procedure similar to that described in Example 2, yielded a product consisting primarily of a dyestuff of the formula

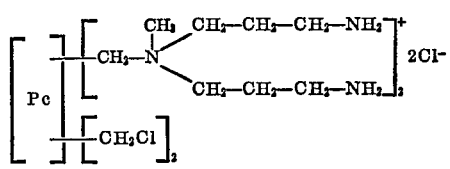

The visible absorption spectrum of an aqueous solution of this dyestuff, containing 0.75 g. of dye per liter of solution, showed two maxima: at 625 millimicrons, A=1.218; at 671 millimicrons, A=1.00.

Example 9

A mixture of 32.7 parts of tetrakis(chloromethyl)-copper phthalocyanine, 11.9 parts of N-(3-dimethylaminopropyl)formamide, and 125 parts of isopropyl alcohol was stirred and heated at 75–80° C. for 45 minutes. To the mixture there was added 5.2 parts of 1,1-dimethylhydrazine and heating was continued for two hours. The mixture was allowed to cool and the solid was removed by filtration, washed with isopropyl alcohol and dried at 85° C. The resulting product, consisting primarily of a dyestuff of the formula

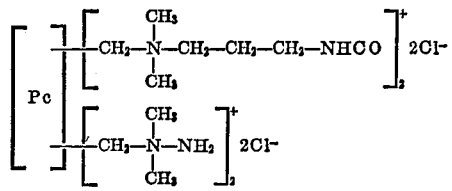

was a blue solid which was readily soluble in water.

The visible absorption spectrum of an aqueous solution of this dyestuff containing 0.02 g. of dye per liter of solution showed two maxima: at 625 millimicrons,

A=0.887;

and at 670 millimicrons, A=0.68.

Example 10

When a procedure similar to that described in Example 1 is followed for the condensationn of N-[2-(N-ethyl-N-1-methylbutyl)aminoethyl]propionamide with bromomethyl coper phthalocyanine, the product obtained is the copper phthalocyanine dyestuff having a singly group of the formula

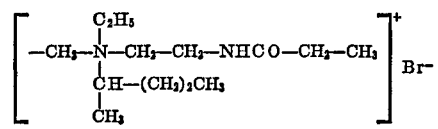

Hydrolysis of the above-mentioned carboxylic acylamino compound according to the method described in Example 2 yields the copper phthalocyanine dyestuff having a single group of the formula

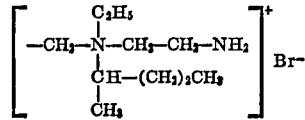

Example 11

Following a procedure similar to that employed in Example 1 herein above, tetrakis(chloromethyl)copper phthalocyanine was condensed with N-(2-dimethylaminoethyl)formamide to obtain the copper phthalocyanine dyestuff having from one to four groups of the formula

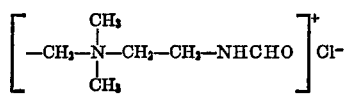

The visible absorption spectrum of an aqueous solution of this dyestuff containing 0.03 g. of dye per liter of solution, showed a maximum at 618 millimicrons, A=1.235.

Hydrolysis of the above-mentioned carboxylic acylamino compound according to the method described in Example 2 yielded the copper phthalocyanine dyestuff having from one to four groups of the formula

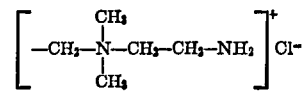

The visible absorption spectrum of an aqueous solution of this dyestuff, containing 0.75 g. of dye per liter of solution showed two maxima; at 623 millimicrons, A=1.44; at 670 millimicrons, A=0.98.

Example 12

When a procedure simliar to that described in Example 1 is followed for the condensation of N-(6-dimethylaminohexyl)isobutyramide with bis(bromomethyl)cobalt phthalocyanine the product obtained is the cobalt phthalocyanine dyestuff having one or two groups of the formula

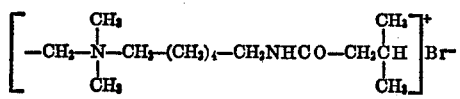

Hydrolysis of the above-mentioned carboxylic acylamino compound according to the method described in Example 2 yields the cobalt phthalocyanine dyestuff having one or two groups of the formula

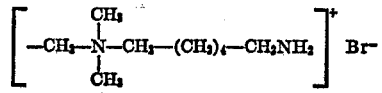

Example 13

Following a procedure similar to that employed in Example 1 hereinabove, tetrakis(chloromethyl)copper phthalocyanine was condensed with N-[2-(4-formylpiperazinoethyl)formamide to obtain the copper phthalocyanine dyestuff having from one to four groups of the formula

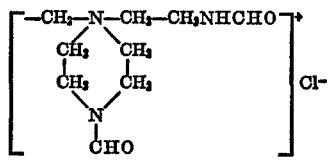

The visible absorption spectrum of an aqueous solution of this dyestuff, containing 0.03 g. of dye per liter of solution, showed two maxima: at 614 millimicrons, $A=1.16$; at 670 millimicrons, $A=0.68$.

Hydrolysis of the above-mentioned carboxylic acylamino compound according to the method described in Example 2 yielded the copper phthalocyanine dyestuff having from one to four groups of the formula

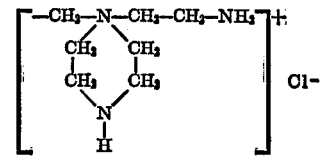

The visible absorption spectrum of an aqueous solution of this dyestuff, containing 1.5 g. of dye per liter of solution, showed two maxima: at 613 millimicrons, $A=1.35$; at 670 millimicrons, $A=0.69$.

EXAMPLE 14

When a procedure similar to that described in Example 1 is followed for the condensation of N-(2-piperidinoethyl)acrylamide with tris(bromoethyl)nickel phthalocyanine, the product obtained is the nickel phthalocyanine dyestuff having from one to three groups of the formula

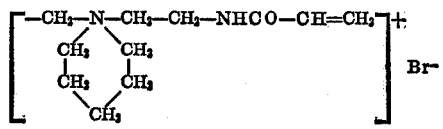

Hydrolysis of the above-mentioned carboxylic acylamino compound according to the method described in Example 2 yields the nickel phthalocyanine dyestuff having from one to three groups of the formula

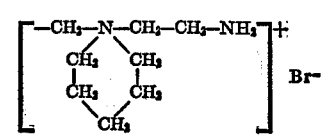

EXAMPLE 15

Following a procedure similar to that employed in Example 1 hereinabove, tetrakis(chloromethyl)copper phthalocyanine was condensed with N-(3-diethanolaminopropyl)formamide to obtain the copper phthalocyanine dyestuff having from one to four groups of the formula

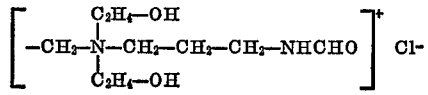

Hydrolysis of the above-mentioned carboxylic acylamino compound according to the method described in Example 2 yields the copper phthalocyanine dyestuff having from one to four groups of the formula

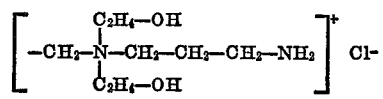

EXAMPLE 16

When a procedure similar to that described in Example 1 is followed for the condensation of N-(3-pyrrolidinylpropyl)valeramide with tetrakis(bromomethyl)iron phthalocyanine, the product obtained is the iron phthalocyanine dyestuff having from one to four groups of the formula

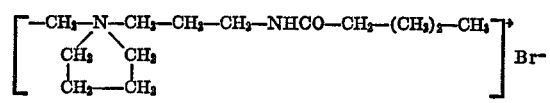

Hydrolysis of the above-mentioned carboxylic acylamino compound according to the method described in Example 2 yields the iron phthalocyanine dyestuff having from one to four groups of the formula

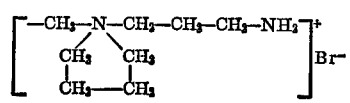

EXAMPLE 17

When a procedure similar to that described in Example 1 is followed for the condensation of N-(1-methyl-3-diethylaminopropyl)acrylamide with pentakis(bromomethyl)zinc phthalocyanine, the product obtained is the zinc phthalocyanine dystuff having from one to five groups of the formula

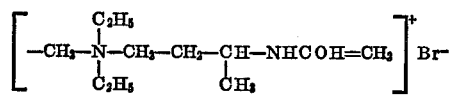

Hydrolysis of the above-mentioned carboxylic acylamino compound according to the method described in Example 2 yields the zinc phthalocyanine dyestuff having from one to five groups of the formula

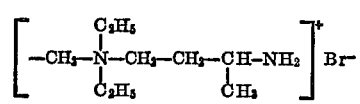

EXAMPLE 18

Following a procedure similar to that employed in Example 1 hereinabove, tetrakis(chloromethyl)copper phthalocyanine was condensed with N-(3-dimethylaminopropyl)benzamide to obtain the copper phthalocyanine dyestuff having from one to four groups of the formula

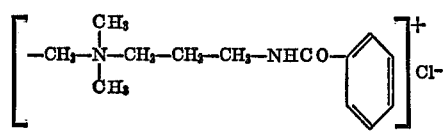

The visible absorption spectrum of an aqueous solution of this dyestuff, containing 0.1 g. of dye per liter of solution showed two maxima: at 607 millimicrons, A=0.65; at 680 millimicrons, A=1.105.

Hydrolysis of the above-mentioned carboxylic acylamino compound according to the method described in Example 2 yields the copper phthalocyanine dyestuff having from one to four groups of the formula

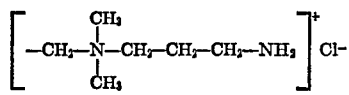

EXAMPLE 19

When a procedure similar to that described in Example 1 is followed for the condensation of 1-ethyl-4-propionyl piperazine with tetrachloro-tetrakis(chloromethyl)copper phthalocyanine, the product obtained is the tetrachloro substituted copper phthalocyanine dyestuff having from one to four groups of the formula

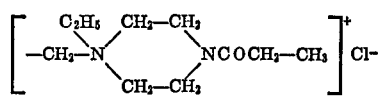

Hydrolysis of the above-mentioned carboxylic acylamino compound according to the method described in Example 2 yields the tetraphenyl-substituted copper phthalocyanine dyestuff having from one to four groups of the formula

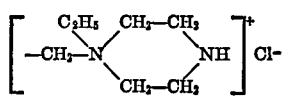

EXAMPLE 20

When a procedure similar to that described in Example 1 is followed for the condensation of N-(2-diethanolamino - 1,1 - dimethylethyl)phenylacetamide with tetraphenyl-tetrakis(bromomethyl)copper phthalocyanine, the the product obtained is the tetraphenyl-substituted copper phthalocyanine dyestuff having from one to four groups of the formula

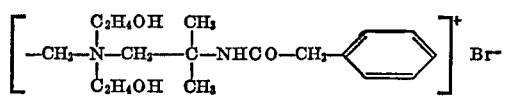

Hydrolysis of the above-mentioned carboxylic acylamino compound according to the method described in Example 2 yields the tetraphenyl-substituted copper phthalocyanine dyestuff having from one to four groups of the formula

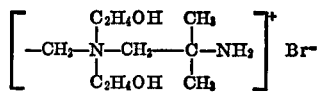

EXAMPLE 21

Following a procedure similar to that employed in Example 1 hereinabove, tetrakis(chloromethyl)copper phthalocyanine was condensed with N-(3-dimethylaminopropyl)phthalamic acid to obtain the copper phthalocyanine dyestuff having from one to four groups of the formula

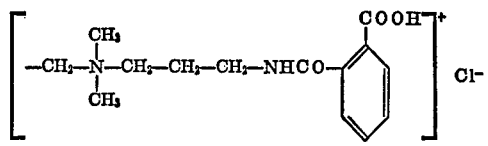

The visible absorption spectrum of an aqueous solution of this dyestuff, containing 0.03 g. of dye per liter of solution, showed two maxima: at 628 millimicrons, A=0.79; at 678 millimicrons, A=1.06.

Hydrolysis of the above-mentioned carboxylic acylamino compound according to the method described in Example 2 yields the copper phthalocyanine dyestuff having from one to four groups of the formula

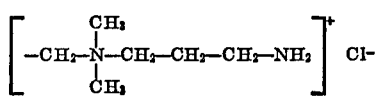

Example 22

When a procedure similar to that described in Example 1 is followed for the condensation of 1-(2-hydroxyethyl)- 4 - (m - toluoyl)piperazine with pentakis(chloromethyl) copper phthalocyanine, the product obtained is the copper phthalocyanine dyestuffs having from one to five groups of the formula

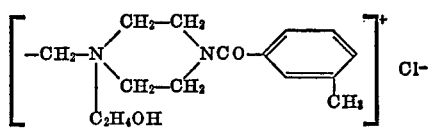

Hydrolysis of the above-mentioned carboxylic acylamino compound according to the method described in Example 2 yields the copper phthalocyanine dyestuff having from one to five groups of the formula

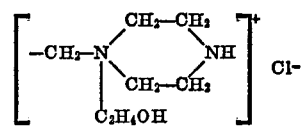

Example 23

When a procedure similar to that described in Example 1 is followed for the condensation of N-(2-dihexylaminoethyl)n-caproamide with tris(chloromethyl)copper phthalocyanine, the product obtained is the copper phthalocyanine dyestuff having from one to three groups of the formula

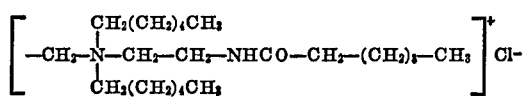

Hydrolysis of the above-mentioned carboxylic amylamine compound according to the method described in Example 2 yields the copper phthalocyanine dyestuff having from one to three groups of the formula

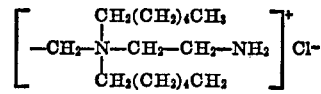

Example 24

When a procedure similar to that described in Example 1 is followed for the condensation of N-[3-(N-methyl-N-2-acetamidoethyl)aminopropyl]acetamide with bromoethyl copper phthalocyanine the product obtained is the copper phthalocyanine dyestuff having a single group of the formula

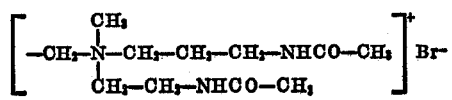

When the procedure outlined in the foregoing examples is followed for the condensation of tetrakis(chloromethyl) copper phthalocyanine with the following compounds, there is obtained a copper phthalocyanine dyestuff having from one to four of the indicated substituents.

| Reactant | Substituent in dyestuff product |
| --- | --- |
| N-methyl-N-(3-pyrrolidinylpropyl)valeramide | ![structure] |
| N-(3-hydroxypropyl)-N-(3-dimethylaminopropyl)formamide | ![structure] |
| N,N-bis[3-(N-methylformamido)propyl]methylamine | ![structure] |
| N-ethyl-N-(2-di-n-propylamino-2-methylethyl)-p-nitrobenzamide | ![structure] |
| N-n-hexyl-N-[2-(N-ethyl-N-methyl)aminoethyl]propionamide | ![structure] |

Hydrolysis of the above-mentioned carboxylic acylamino compound according to the method described in Example 2 yields the copper phthalocyanine dyestuff having a single group of the formula

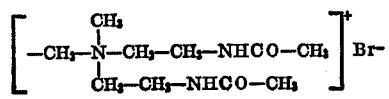

When the procedure outlined in the foregoing examples is followed for the condensation of tetrakis(chloromethyl) copper phthalocyanine with the following compounds and the acylamino moiety is hydrolyzed as hereinbefore described, there is obtained a copper phthalocyanine dyestuff having from one to four of the indicated substituents:

| Reactant | Substituent in dyestuff product |
| --- | --- |
| N-methyl-N-[2-(N-ethyl-N-methyl)aminoethyl]propionamide | ![structure] |
| N-(3-hydroxypropyl)-N-(3-dimethylaminopropyl)formamide | ![structure] |
| N-isopropyl-N-(2-piperidinoethyl)acrylamide | ![structure] |
| N-[3-(N-methylacetamido)propyl]-N-[2-(N-methylacetamido)ethyl]methylamine | ![structure] |

We claim:
1. The water-soluble dyestuff of the formula

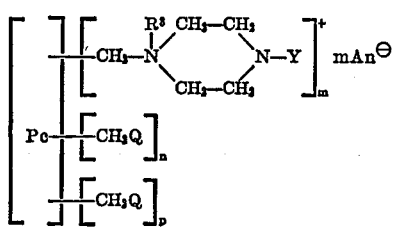

wherein:
- $m$ is an integer from one to five, $n$ is an integer from zero to two, $p$ is an integer from zero to four and $m+n+p$ does not exceed 5;
- $R^3$ is lower-alkyl, hydroxyl-lower-alkyl or phenyl-lower-alkyl;
- Y is hydrogen, lower-alkanoyl, lower-alkenoyl, benzoyl or phenyl-lower-alkanoyl;
- Q is hydroxy, lower-alkoxy or hydroxy-lower-alkoxy;
- An is an anion;
- X is bromine or chlorine; and
- Pc is a metal-free phthalocyanine radical or a metal phthalocyanine radical wherein the metal is copper, cobalt, iron, nickel or zinc.

2. The water-soluble dyestuff according to claim 1 of the formula

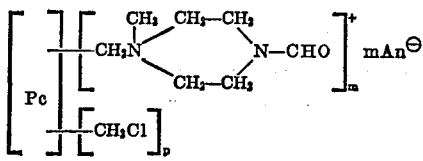

wherein:
$n$ is zero, $m$ is 2–4, $p$ is 0–2 and $m+p$ is 4; and wherein Pc is either a metal-free phthalocyanine radical or copper-containing phthalocyanine radical.

References Cited
UNITED STATES PATENTS

| | | | |
|---|---|---|---|
| 3,133,059 | 5/1964 | Clark et al. | 260—242 |
| 3,210,345 | 10/1965 | Gamlen et al. | 260—242 |
| 3,288,621 | 11/1966 | Barron et al. | 260—288 |
| 3,320,020 | 5/1967 | Tartter et al. | 260—314.5 X |
| 3,454,568 | 7/1969 | Fuchs et al. | 260—242 |
| 3,565,570 | 2/1971 | Dien | 260—314.5 X |

FLOYD D. HIGEL, Primary Examiner

U.S. Cl. X.R.

8—7; 117—138.8 R, 143 R, 154; 260—268 R, 268 H, 314.5, 293.86, 326.3, 558 R, 561 R

UNITED STATES PATENT AND TRADEMARK OFFICE
CERTIFICATE OF CORRECTION

PATENT NO. : 3,784,599
DATED : January 8, 1974
INVENTOR(S) : Patrick J. Jefferies and Nathan N. Crounse It is certified that error appears in the above-identified patent and that said Letters Patent are hereby corrected as shown below:

Column 1, line 29, Abstract, "$R^1$ or $R^2$" should read -- $R^1$ and $R^2$ --.

Column 2, line 11, structure should be labelled Formula I.

Column 3, line 25, "$-(CH_3)-$" should read -- $-CH(CH_3)-$ --.

Column 5, line 59, "fully" should read -- full --.

Column 6, line 30, "substituent" should read -- substituents --.

Column 7, line 56, "g" should read -- 5 --.

Column 8, line 12, "piperadionethyl" should read -- piperidinoethyl --.

Column 8, line 71, "(2" should read -- [2 --.

Column 23, Claim 1, line 13, "$[CH_2Q]_p$" should read -- $[CH_2X]_p$ --.

Signed and Sealed this

First Day of August 1978

[SEAL]

Attest:

RUTH C. MASON
*Attesting Officer*

DONALD W. BANNER
*Commissioner of Patents and Trademarks*